Patented July 10, 1945

2,380,192

UNITED STATES PATENT OFFICE 2,380,192

ROSIN MODIFIED PHENOL-ALDEHYDE RESIN

Raymond F. Schlaanstine, Kennett Square, Pa., assignor to Hercules Powder Company, Wilmington, Del., a corporation of Delaware No Drawing. Application March 30, 1942, Serial No. 436,834

1 Claim. (Cl. 260—20)

This invention relates to improved coating compositions and to methods for their production, and more particularly to coating compositions containing improved modified phenol-aldehyde type resins and to methods for their production.

For a long time, it has been known to produce coating compositions by cooking a rosin ester modified phenol-aldehyde type resin with a drying oil, and then thinning the mixture with a volatile solvent in order to produce a varnish composition. Such varnishes possess certain valuable properties in that they are quick drying, durable, and have high water and alkali resistance. However, the rosins from which these varnish compositions have been prepared all contain a high percentage of neutral bodies, usually at least about nine per cent by weight. Due partly to the presence of these neutral bodies, the varnishes possess certain undesirable properties. For example, soft oil varnishes, such as linseed oil varnishes, cannot be cooked at the necessary high temperatures without producing a dark colored varnish. Furthermore, such varnishes exhibit a serious tendency to turn dark with age and upon exposure to light rich in ultraviolet.

Various methods have been employed, but with little success, to remove the defects caused in large part by the presence of the neutral bodies in the rosins used in the preparation of the modified phenolic resin varnishes. For instance, varnishes have been prepared from phenolic resins modified with distilled rosins, but such varnishes are not superior to the varnishes produced using ordinary rosin, since distillation does not remove the neutral bodies.

Now, in accordance with this invention, it has been found that modified phenol-aldehyde type coating compositions of lighter color, of greatly increased color stability, and of other highly desirable properties described hereafter, are prepared by the use of a phenol-aldehyde type resin modified with a polyhydric alcohol ester of a crystallized rosin acid having a neutral body content below about two per cent by weight and an acid number above about 181. Thus, it has been determined, in accordance with this invention, that with the use of a crystallized rosin acid of the requisite low neutral body content and high acid number greatly improved coating compositions are produced.

The improved coating compositions of this invention are produced by the procedures usually employed in the art in the preparation of rosin ester modified phenolic resin varnishes. Thus, a drying oil and a phenol-aldehyde type resin modified with a polyhydric alcohol ester of a crystallized rosin acid having the necessary low neutral body content and high acid number are heated together until a solution of the requisite viscosity is obtained, after which the varnish base is thinned with a volatile solvent.

Crystallized rosin acids suitable for use in preparing the improved coating compositions may be obtained from either wood or gum rosin. For example, they may be obtained by crystallization from a rosin solution in an inert organic solvent, such as ethyl alcohol, and isolating a crystallized resin acid of the necessary low neutral body content and high acid number. Suitable crystallized rosin acids may also be prepared according to the method described in an application, Serial No. 385,415, now U. S. Patent 2,296,503, filed March 27, 1941, by Richard F. B. Cox.

Having now indicated in a general way the nature and purpose of this invention, there follow specific examples to illustrate how these improved modified, phenol-aldehyde coating compositions may be prepared. In the examples, the term "parts" represents weight units, unless otherwise indicated.

Example 1

A resin syrup was prepared by the reaction of the following: four hundred forty-four parts of para-tertiary amyl phenol, 275 parts of formalin, 1 part of glacial acetic acid, and 60 parts of a five per cent by weight aqueous solution of sodium hydroxide. The 444 parts of para-tertiary amyl phenol and 250 parts of formalin were reacted in the presence of the glacial acetic acid for a period of 31 hours at a temperature of 180° F., and the reaction mixture was then refluxed for a further period of 4 hours. To this mixture were added 25 parts of formalin and 60 parts of aqueous sodium hydroxide solution, and the refluxing continued for a further period of three hours, at which time a resin layer separated from the water layer. This resin was separated and washed with distilled water, and a crystallized rosin modified resin was then prepared from this phenolic resin by reacting the following: one hundred parts of rosin crystals (prepared by crystallization from solution of N wood rosin in ethyl alcohol and wet with about three per cent by weight of ethyl alcohol) having an acid number of 183 and a neutral body content of less than one per cent by weight, 3.5 parts of maleic anhydride, 14 parts of pentaerythritol, and 15 parts of the phenol-formaldehyde resin. The maleic anhydride was added to the rosin crystals and the mixture heated at a temperature of 200° C. in an inert atmosphere for a period of one hour. The mixture was then cooled to 120° C. and the phenolic resin added, after which the temperature of the mixture was again raised to 200° C. and held there for a period of one-half hour. After this, the pentaerythritol was added and the temperature of the mixture raised to 285° C. in a period of about one hour, and the temperature held there for a period of about 12 to 15 hours. A resin having a drop melting point of 153° C., an acid number of 15, and a color of 14 Amber (Lovibond scale) resulted. A 25 gallon oil length Z3 body linseed oil varnish was made containing 100 pounds of resin and 25 gallons of Z3 body linseed oil. The ingredients were added to a varnish kettle and the temperature of the mixture brought to 585° F. in a period of 40 minutes. The mixture was held at this temperature for 2 hours and 50 minutes, and thinned with mineral spirits. When thinned to 50% solids by weight, this varnish had a Gardner-Holdt viscosity of E and a color of 3L Hellige. A comparison varnish prepared by cooking a resin prepared from N wood rosin in place of the rosin crystals was characterized by a much darker color than the varnish prepared from the rosin crystals. In subsequent discoloration tests, the varnish prepared from the resin prepared from rosin crystals showed greatly increased color stability over the varnish prepared using the resin prepared from N wood rosin, and in an enamel composition the light colored varnish prepared from the rosin crystals baked out much mode rapidly than the varnish prepared from the N wood rosin.

Example 2

A varnish was prepared containing 100 pounds of the rosin crystal resin produced in Example 1, 5 gallons of Z3 body linseed oil, and 20 gallons of tung oil. A mixture of 15 gallons of tung oil, the linseed oil, and the resin was heated to a temperature of 575° F. in a period of 35 minutes, and the mixture was held at that temperature for five minutes, after which the remainder of the tung oil was added. The temperature of the mixture was then reduced to 530° F., where it was held for a period of about five minutes, after which the varnish composition was cooled and thinned with mineral spirits to a mixture containing 50% by weight solids to produce a varnish having a Hellige color of 3L. A comparison varnish prepared from phenolic N wood rosin ester prepared using N wood rosin in place of the rosin crystals had a much darker color. Furthermore, the tung oil varnish made from the rosin crystal modified phenolic resin was adequately gasproofed, whereas the varnish containing the N wood rosin phenolic resin was not gasproofed. Also, more drastic and difficult kettling procedures are necessary to gasproof the tung oil varnish containing the N wood rosin modified phenolic resin.

Example 3

A phenolic syrup was prepared from the following: one hundred sixty-eight parts of ortho- and para-cresol mixture, 300 parts of phenol, 495 parts of formalin, 1 part of glacial acetic acid, and 100 parts of five per cent by weight aqueous sodium hydroxide solution. The cresol, phenol, 450 parts of formalin, and the glacial acetic acid were reacted together at a temperature of 120° F. for a period of 36 hours, and the mixture was then refluxed at 212° F. for a further period of four hours. Forty-five parts of formalin and the aqueous sodium hydroxide solution were finally added, and the whole mixture was then refluxed for three more hours, after which a resinous mixture separated from the water layer. This resinous material was washed with distilled water. To make the finished resin from the phenolic syrup, the following ingredients were employed: one hundred parts of the rosin crystals employed in Example 1, 3.5 parts of maleic anhydride, 14 parts of pentaerythritol, and 4 parts of the phenolic syrup. The rosin crystals and maleic anhydride were first reacted together at 230° C. for a period of one hour to form an adduct, after which the phenol-formaldehyde resin was added. After the temperature was raised to 250° C., the pentaerythritol was added and the entire mixture brought to a temperature of 285° C. and held there for a period of about 12 to 15 hours in an inert atmosphere. The hot resin was sparged with carbon dioxide to remove volatile materials, thus yielding a resin with a drop melting point of 150° C., an acid number of 11.5, and a Lovibond color of 31 Amber. A varnish was made with the rosin crystal resin, containing 100 pounds of the phenolic resin previously prepared and 25 gallons of Z3 body linseed oil. These ingredients were charged into a suitable vessel and the temperature of the mixture was raised to 585° F. in 45 minutes, at which point the temperature was maintained for a period of 2 hours and 35 minutes. The mixture was then cooled and thinned with mineral spirits to a varnish composition containing 50% solids by weight. This varnish composition had a Gardner-Holdt viscosity of D and a Hellige color of 4L. Naphthenate driers were then added to produce a varnish containing 0.2% calcium, 0.1% lead, and 0.07% cobalt by weight based on the oil contained in the varnish. This varnish dried tack free in a period of 7 hours and 50 minutes, an exceptionally fast drying time for a soft oil varnish containing a phenolic type resin.

Example 4

A varnish was prepared comprising the following ingredients: one hundred parts of rosin crystals (prepared by crystallization from solution of N wood rosin in ethyl alcohol and wet with about three per cent by weight of ethyl alcohol) having an acid number of 182 and a neutral body content of about one per cent by weight, 50 parts of the phenolic resin prepared in Example 1, 100 parts of the phenolic resin prepared in Example 3, 10 parts of paraformaldehyde, and 91 parts of glycerin. The rosin crystals were dissolved in "Cellosolve" (ethylene glycol monoethyl ether) to yield a 90% by weight solution of crystals. This solution was heated to 100° C., and an 80% by weight solution of the phenolic resins dissolved in "Cellosolve" (ethylene glycol monoethyl ether) was added, the paraformaldehyde being added at the same time. The mixture was then heated to 200° C. and held at that temperature for a period of 40 minutes, after which the glycerol was added and the entire mixture heated to 285° C. and held there for a period of 12 hours in an inert atmosphere. The resin was sparged free of volatile materials, yielding a resin characterized by a drop melting point of 125° C., an acid number of 15.5, and a Lovibond color of 35 Amber. A varnish was then prepared from this resin comprising the following ingredients: one hundred pounds of the glycerin-phenolic resin, 20 gallons of tung oil, and 5 gallons Z3 body linseed oil. First, a mixture of the resin, 15 gallons of tung oil, and the linseed oil was heated to a temperature of 575° F., at which point the mixture was held for five minutes and the remaining tung oil added, thus reducing the temperature of the mixture to 545° F., at which temperature the varnish composition was held for five minutes. The varnish was then permitted to cool and was then thinned with mineral spirits to a composition containing 50% solids by weight. A comparison varnish was made from a comparison resin prepared using N wood rosin in place of the rosin crystals. The varnish prepared from the rosin crystals was characterized by a higher viscosity, a lighter color, a shorter inital set time, and a much shorter tack free time than the varnish prepared from the N wood rosin. Furthermore, the varnish prepared from the rosin crystals passed the gasproofing test, whereas the varnish prepared from the N wood rosin failed this test. Also, the varnish prepared from the rosin crystals exhibited increased color stability with aging over that of the varnish prepared from the N wood rosin.

Example 5

A varnish was prepared containing 100 pounds of the rosin crystal resin of Example 4 and 25 gallons of Z3 body linseed oil by heating these ingredients to 585° F. in a period of 40 minutes and holding the temperature there for a further period of three hours. When cooled and thinned with mineral spirits to a composition containing 50% solids by weight, a varnish having a Gardner-Holdt viscosity of A and a Hellige color of 3 was produced. This varnish had a higher viscosity and a much lower color than a comparison varnish containing N wood rosin in place of the rosin crystals.

Example 6

A varnish resin was prepared comprising the following ingredients: one hundred parts of the rosin crystals employed in Example 1, 3.5 parts of maleic anhydride, 200 parts of Bakelite 3360 (a commercial type heat-reactive phenolic resin formed by condensation of a phenylphenol and formaldehyde), 40 parts of paraformaldehyde, and 140 parts of pentaerythritol. The rosin crystals, maleic anhydride, and paraformaldehyde were first heated together to a temperature of 230° C. in an inert atmosphere and held there for a period of one hour, after which the phenolic resin was added and the temperature lowered to 200° C. The pentaerythritol was then added and the temperature of the entire mixture was increased to 285° C., at which temperature the reaction mixture was held for a period of from 12 to 15 hours. The resin was sparged for 45 minutes with carbon dioxide gas to remove the volatile components of the resin, thus yielding a resin having a drop melting point of 172° C., an acid number of 16, and a Lovibond color of 65 Amber. A varnish was then prepared comprising the following ingredients: one hundred pounds of the rosin crystal modified phenolic resin previously prepared, 20 gallons of tung oil, and 5 gallons of Z3 linseed oil. Fifteen gallons of tung oil, the linseed oil, and the resin were heated to 575° F. in 45 minutes, at which point the remaining tung oil was added. The temperature of the entire mixture was then increased to 580° F. and held there for a further period of five minutes. The varnish was then cooled and thinned with mineral spirits to a composition containing 50% by weight solids. This varnish had a Hellige color of 4L and a Gardner-Holdt viscosity of I+, which were substantially better than the properties of a comparison varnish prepared by cooking a similar resin obtained from N wood rosin in place of the rosin crystals. The tack free time of the varnish prepared from the rosin crystals was 5 hours and 40 minutes, a much shorter tack free time than that of the comparison varnish prepared from N wood rosin.

Example 7

A phenolic resin was directly modified with the pentaerythritol ester of a crystallized rosin acid according to the following procedure: A mixture of 300 parts of phenol, 150 parts of mixed cresols, and 378 parts of formalin was reacted at 175° F. for four hours in the presence of 4 parts of dilute hydrochloric acid. Twenty parts of formalin and 20 parts of a concentrated aqueous solution of ammonium hydroxide were then added and the reaction continued at 150-175° F. for a further period of 72 hours. One hundred parts of the resulting resin were mixed with 500 parts of the reaction product of 11 parts of pentaerythritol and 100 parts of the crystallized rosin acids used in Example 4. This modified phenolic resin was made into a 25 gallon linseed oil varnish by cooking at 585° F. for two hours. A comparison varnish was prepared according to this same procedure except that N wood rosin was employed in place of the rosin crystals. Subsequent tests showed that the varnish prepared from the rosin crystals had greatly improved color and color stability, and rapidity of drying, in comparison with the varnish prepared from the N wood rosin.

Example 8

A varnish composition containing a modified, terpene-substituted phenolic resin was prepared according to the following procedure: Three hundred parts of a mixture of terpenes boiling between about 180 and about 210° C., 20 parts of maleic anhydride, and 188 parts of phenol were reacted at 185° F. for two hours and then held at room temperature for 72 hours more. To this reaction mixture were added 200 parts of formalin, and the mixture was kept at room temperature for a further period of 48 hours in the presence of one part of glacial acetic acid and one-half part of hydrochloric acid, after which the mixture was refluxed on a hot plate for a further period of two hours. To this resin were added 184 parts of a five per cent by weight aqueous sodium hydroxide solution and 20 parts of formalin. The entire mixture was refluxed for two hours more to produce a resin which separated completely from the water layer in the mixture. One hundred parts of the rosin crystals used in Example 1 were melted at 100° C. and 20 parts of the terpene-substituted phenolic resin previously prepared was added under an inert atmosphere. Nine and one-half parts of glycerin were added to the reaction mixture, which was then heated at 285° F. for 15 hours. This modified phenol-aldehyde resin was used in a 25 gallon linseed oil varnish as follows: One hundred pounds of the resin and 25 gallons of Z3 body linseed oil were heated to 585° F. in 40 minutes and held at that temperature for 2 hours and 45 minutes. After this, the oleoresinous base just prepared was diluted with mineral spirits to produce a solution containing 50% solids by weight. This varnish had a Gardner-Holdt viscosity of H and a color of 3 Hellige. A corresponding varnish prepared using N wood rosin in place of the rosin crystals exhibited much darker initial color and poorer color stability and also showed a considerably greater drying time.

Crystallized rosin acids having neutral body contents below about two per cent by weight and acid numbers above about 181, suitable for use in the production of the improved modified phenolic varnishes of this invention, may be prepared from either wood or gum rosin. Thus, the rosin crystals employed in the examples were obtained by dissolving wood rosin in hot ethyl alcohol and allowing the solution to cool. Upon cooling, about 30% of the weight of the rosin in solution crystallized out and was separated from the mother liquor by filtering and centrifuging, yielding a crystallized rosin acid of the required low neutral body content and high acid number. In place of the ethyl alcohol, there may be used any other inert organic solvent, such as isopropyl alcohol, acetone, etc. Suitable crystallized rosin acids may also be prepared according to the method described in an application, Serial No. 385,415, now U. S. Patent 2,296,503, filed March 27, 1941, by Richard F. B. Cox. This method involves mixing an alkali metal abietate with rosin to form an acid abietate, contacting the acid abietate with a polar solvent for alkali abietate and a nonpolar solvent for abietic acid which is immiscible with the polar solvent, separating the phases, and recovering a resin acid by crystallization from the nonpolar solvent.

Modified phenolic resins which are suitable for the preparation of the improved varnish may be prepared by the use of any polyhydric alcohol. Thus, in place of the glycerol and pentaerythritol, shown in the examples, there may be used ethylene glycol, diethylene glycol, triethylene glycol, polyethylene glycol, propylene glycol, butylene glycol, trimethylene glycol, tetramethylene glycol, diglycerol, triglycerol, polyglycerol, erythritol, etc. and mixtures thereof. Any of the phenol-aldehyde resins commonly employed in practice may be modified to produce resins which can be cooked to make the improved varnish compositions. In the examples, phenolic resins prepared from phenol, mixed xylenols, and terpene-substituted phenols were cooked into varnishes. In their place there may be employed phenolic resins prepared from cresols, bisphenols, para-substituted phenols, naphthols, modified naphthols, terpene ethers, and the like. Furthermore, suitable modified phenol-aldehyde resins may be prepared using any of the aldehydes usually employed in the production of phenolic resins. In the examples, formalin and paraformaldehyde were used, but other aldehydes, such as acetaldehyde, propionaldehyde, benzaldehyde, furfural, crotonaldehyde, etc. are also suitable. Methods for the preparation of the modified phenolic resins from which the improved coating compositions of this invention are prepared are disclosed in detail in my copending application, Serial No. 436,837, filed March 30, 1942.

The examples illustrate the preparation of the improved varnishes by cooking the resins with linseed oil and tung oil. In their place, there may be used any of the drying or semi-drying oils, such as perilla oil, oiticica oil, soybean oil, fish oil, etc. When a semi-drying oil is used in admixture with a drying oil, the proportion of the former should not be so high as to affect seriously the improved drying characteristics of the varnish produced as described herein.

In the examples, kettling temperatures of about 530 and 585° F. have been shown. The temperatures generally employed in the art are suitable for the preparation of the compositions of this invention. Preferably, however, the improved varnishes are cooked at a temperature between about 500° F. and about 600° F. The period of time for which the coating composition must be cooked will depend upon such factors as the particular drying oil used, the phenolic resin, the ratio of drying oil to resin, the final viscosity desired by the formulator, etc. The relative proportions of drying oil and modified phenolic resin are those usually employed in the art, but preferably the amount of resin employed will be from about 12 to about 55% by weight based upon the total varnish solids.

Any of the usual thinners may be employed in place of the mineral spirits used as a diluent in the examples. Thus, there may be used V. M. and P. naphtha, kerosene, benzol, toluol, xylol, Hi-flash naphtha, tetrahydronaphthalene, decahydronaphthalene, hydrogenated volatile petroleum hydrocarbon solvents rich in cyclic compounds such as those sold under the trade names of Solvesso Nos. 1, 2, 3, and 4, etc. In the examples, the oleoresinous base was diluted with spirits to form a solution containing 50% solids by weight. The amount of volatile solvent employed will depend upon the properties desired in the finished product, but preferably the finished varnish composition will contain between about 45 and about 55% by weight of solvent.

The varnish compositions may also contain the driers generally employed in the art in coating compositions. For example, the naphthenates, linoleates, and resinates of cobalt, manganese, and lead are useful in those proportions generally used. The pigmenting materials generally employed may be added to the varnish compositions where it is desired to produce a pigmented coating composition.

The coating compositions produced according to this invention are improved varnishes and possess many distinct advantages. Thus, they are characterized by a light initial color and by great color stability when subjected to weather, elevated temperatures, and to light which is rich in ultraviolet rays. Also, pigments may be added to the varnishes to produce enamels, particularly white enamels, which will not yellow with age. Furthermore, the improved varnishes are more readily prepared since they require a shorter kettling time to attain the proper viscosity and the varnishes dry in a shorter period of time, resulting in the formation of a harder, gasproofed protective film.

What I claim and desire to protect by Letters Patent is:

A pale drying oil varnish with a color no greater than 3L Hellige, characterized by color stability, consisting of a heat-bodied mixture of linseed oil and resin in the proportion of about 100 pounds of resin per 25 gallons of oil, and suitable mineral spirits thinner, the resin being the pale heat-reaction product of 100 parts of rosin acid crystals crystallized from wood rosin and having an acid number of about 183 and a neutral body content of less than 1%, 3.5 parts of maleic anhydride, 15 parts of resinous condensate of para-tertiary-amyl phenol and formalin prepared by refluxing the latter two substances in a ratio of about 1.8 to 1 first with acetic acid and then with sodium hydroxide, and 14 parts of pentaerythritol, reacted until the said resin has an acid number of about 15.

RAYMOND F. SCHLAANSTINE.